US010238977B2

(12) United States Patent
Reiche et al.

(10) Patent No.: US 10,238,977 B2
(45) Date of Patent: Mar. 26, 2019

(54) COLLECTION OF MARKETING INFORMATION DEVELOPED DURING VIDEO GAME PLAY

(75) Inventors: Paul Reiche, Novato, CA (US); Joby-Rome Otero, Santa Monica, CA (US); Charles H Batson, III, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 13/109,896

(22) Filed: May 17, 2011

(65) Prior Publication Data

US 2012/0295714 A1    Nov. 22, 2012

(51) Int. Cl.
*G06Q 30/02* (2012.01)
*A63F 13/95* (2014.01)
*A63F 13/77* (2014.01)

(52) U.S. Cl.
CPC .............. *A63F 13/95* (2014.09); *A63F 13/77* (2014.09); *A63F 2300/403* (2013.01); *A63F 2300/405* (2013.01); *A63F 2300/535* (2013.01); *A63F 2300/554* (2013.01); *A63F 2300/5506* (2013.01)

(58) Field of Classification Search
CPC ...................................................... G06Q 30/02
USPC ....................................................... 705/7.29
See application file for complete search history.

(56) References Cited

U.S. PATENT DOCUMENTS

| 4,840,602 | A | 6/1989 | Rose |
| 5,413,355 | A | 5/1995 | Gonzalez |
| 5,533,920 | A | 7/1996 | Arad et al. |
| 5,661,470 | A | 8/1997 | Karr |
| 5,752,880 | A | 5/1998 | Gabai et al. |
| 5,766,077 | A | 6/1998 | Hongo |
| 5,810,666 | A | 9/1998 | Mero et al. |
| 5,853,327 | A | 12/1998 | Gilboa |
| 5,873,765 | A | 2/1999 | Rifkin et al. |
| 6,056,618 | A | 5/2000 | Larian |
| 6,083,073 | A | 7/2000 | McFarlane et al. |
| 6,167,353 | A | 12/2000 | Piernot et al. |
| 6,290,565 | B1 | 9/2001 | Galyean, III et al. |
| 6,354,947 | B1 | 3/2002 | Dobrusskin et al. |
| 6,491,566 | B2 | 12/2002 | Peters et al. |
| 6,544,097 | B1 | 4/2003 | Bain |

(Continued)

FOREIGN PATENT DOCUMENTS

WO    WO 2005/050948    6/2005

OTHER PUBLICATIONS

Joint Technical Committee ISO/IEC JTC1/SC17, Information Technology, Subcommittee SC17, Final Committee Draft ISO/IEC 14443-3, Identification Cards—Contactless Integrated Circuit(s) Cards—Proximity Cards, Part 3: Initialization and Anticollision. Jun. 11, 1999.

(Continued)

*Primary Examiner* — Kurtis Gills
(74) *Attorney, Agent, or Firm* — Klein, O'Neill & Singh, LLP (57) ABSTRACT

A system and method for collecting information related to a video game including a physical object such as a toy. The system includes a game console having a processor for executing instructions to conduct video game play using the physical object. During the game play, data related to the toy may be stored for on the physical object or game console and provided to a server.

18 Claims, 10 Drawing Sheets

(56) References Cited

U.S. PATENT DOCUMENTS

| | | | |
|---|---|---|---|
| 6,709,336 B2 | 3/2004 | Siegel et al. | |
| 6,729,934 B1 | 5/2004 | Driscoll et al. | |
| 6,737,957 B1 | 5/2004 | Petrovic et al. | |
| 6,761,637 B2 | 7/2004 | Weston et al. | |
| 6,773,325 B1 * | 8/2004 | Mawle | A63F 13/02 446/175 |
| 6,773,326 B2 | 8/2004 | Jarvis | |
| 6,796,908 B2 | 9/2004 | Weston | |
| 6,905,391 B2 | 6/2005 | Soto et al. | |
| 6,965,298 B2 | 11/2005 | Feinberg | |
| 6,967,566 B2 | 11/2005 | Weston et al. | |
| 7,001,276 B2 | 2/2006 | Shinoda | |
| 7,066,781 B2 | 6/2006 | Weston | |
| 7,081,033 B1 | 7/2006 | Mawle et al. | |
| 7,244,183 B1 | 7/2007 | England | |
| 7,297,063 B2 | 11/2007 | Fujisawa et al. | |
| 7,331,857 B2 | 2/2008 | MacIver | |
| 7,338,377 B2 | 3/2008 | Shinoda | |
| 7,387,559 B2 | 6/2008 | Sanchez-Castro et al. | |
| 7,425,169 B2 | 9/2008 | Ganz | |
| 7,465,212 B2 | 12/2008 | Ganz | |
| 7,488,231 B2 | 2/2009 | Weston | |
| 7,500,917 B2 | 3/2009 | Barney et al. | |
| 7,502,759 B2 | 3/2009 | Hannigan et al. | |
| 7,524,246 B2 | 4/2009 | Briggs et al. | |
| 7,534,157 B2 | 5/2009 | Ganz | |
| 7,568,964 B2 | 8/2009 | Ganz | |
| 7,604,525 B2 | 10/2009 | Ganz | |
| 7,614,958 B2 | 11/2009 | Weston et al. | |
| 7,618,303 B2 | 11/2009 | Ganz | |
| 7,677,948 B2 | 3/2010 | Ganz | |
| 7,789,726 B2 | 9/2010 | Ganz | |
| 7,843,471 B2 | 11/2010 | Doan et al. | |
| 7,846,004 B2 | 12/2010 | Ganz | |
| 7,850,527 B2 | 12/2010 | Barney et al. | |
| 7,862,428 B2 | 1/2011 | Borge | |
| 7,878,905 B2 | 2/2011 | Weston et al. | |
| 7,883,416 B2 | 2/2011 | Dobrusskin et al. | |
| 7,883,420 B2 | 2/2011 | Bradbury et al. | |
| 2003/0076369 A1 | 4/2003 | Resner et al. | |
| 2004/0214642 A1 | 10/2004 | Beck | |
| 2006/0116192 A1 * | 6/2006 | Okada | 463/20 |
| 2007/0006275 A1 * | 1/2007 | Wright | H04N 21/44204 725/133 |
| 2007/0066396 A1 * | 3/2007 | Weston | A63F 13/98 463/39 |
| 2007/0143679 A1 | 6/2007 | Resner | |
| 2007/0197297 A1 | 8/2007 | Witchey | |
| 2007/0250597 A1 | 10/2007 | Resner et al. | |
| 2007/0256716 A1 | 11/2007 | Resner et al. | |
| 2008/0081694 A1 * | 4/2008 | Hong et al. | 463/34 |
| 2008/0140528 A1 | 6/2008 | Ganz et al. | |
| 2008/0141367 A1 | 6/2008 | Ganz et al. | |
| 2008/0163055 A1 | 7/2008 | Ganz et al. | |
| 2008/0274805 A1 | 11/2008 | Ganz et al. | |
| 2008/0274806 A1 | 11/2008 | Ganz et al. | |
| 2008/0274811 A1 | 11/2008 | Ganz et al. | |
| 2008/0275789 A1 | 11/2008 | Ganz et al. | |
| 2009/0053970 A1 | 2/2009 | Borge | |
| 2009/0054155 A1 | 2/2009 | Borge | |
| 2009/0063271 A1 | 3/2009 | Ganz et al. | |
| 2009/0124165 A1 | 5/2009 | Weston | |
| 2009/0132267 A1 | 5/2009 | Ganz | |
| 2009/0132357 A1 | 5/2009 | Ganz | |
| 2009/0132656 A1 | 5/2009 | Ganz | |
| 2009/0158210 A1 | 6/2009 | Cheng et al. | |
| 2009/0204420 A1 | 8/2009 | Ganz | |
| 2009/0204908 A1 | 8/2009 | Ganz et al. | |
| 2009/0228557 A1 | 9/2009 | Ganz et al. | |
| 2009/0240659 A1 | 9/2009 | Ganz et al. | |
| 2009/0248544 A1 | 10/2009 | Ganz | |
| 2009/0254434 A1 | 10/2009 | Ganz et al. | |
| 2009/0307609 A1 | 12/2009 | Ganz et al. | |
| 2009/0318234 A1 | 12/2009 | Christensen et al. | |
| 2010/0042486 A1 | 2/2010 | Borst et al. | |
| 2010/0058235 A1 | 3/2010 | Borst | |
| 2010/0062817 A1 * | 3/2010 | Seydoux | 463/6 |
| 2010/0107214 A1 | 4/2010 | Ganz | |
| 2010/0151940 A1 | 6/2010 | Borge | |
| 2010/0161443 A1 | 6/2010 | Ganz et al. | |
| 2010/0167623 A1 * | 7/2010 | Eyzaguirre et al. | 463/40 |
| 2010/0262489 A1 * | 10/2010 | Salinas | 705/14.49 |
| 2010/0293473 A1 | 11/2010 | Borst et al. | |
| 2010/0325182 A1 | 12/2010 | Ganz | |
| 2011/0040638 A1 * | 2/2011 | Rabenold et al. | 705/14.73 |
| 2011/0077080 A1 * | 3/2011 | Meer | 463/32 |
| 2011/0161093 A1 | 6/2011 | Ganz | 705/1.1 |
| 2012/0028707 A1 * | 2/2012 | Raitt et al. | 463/31 |

OTHER PUBLICATIONS

Atmel, Requirements of ISO/IEC 14443 Type B Proximity Contactless Identification Codes. Nov. 2005.

Microchip, microID 13.56 MHz RFID System Design Guide. 2004.

Sonmicro, SM130, SM1013 Evaluation Kit, Mifare Brief Technical Information, SMRFID MIFARE v1.0 Software, User Manual, Jun. 2006.

* cited by examiner

COLLECTION OF MARKETING INFORMATION DEVELOPED DURING VIDEO GAME PLAY

BACKGROUND OF THE INVENTION

The present invention relates generally to video games and, more particularly, to a video game and a peripheral for a video game.

Toys such as dolls, cars and robots provide countless hours of fun and enjoyment for many. Toys often serve as a vehicle for expanding the imagination and cultivating creativity.

Video games also provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a roll or activity being a fantasy.

However it is generally difficult to acquire marketing information from video game consumers. Market surveys have been used, but require significant effort to prepare the questions and substantial resources to collect the responses. These surveys also depend heavily on the truthful and accuracy recollection of the survey takers. Even still, a substantial expenditure of resources and capital are required before it is known whether the data collected is provide the desired information.

BRIEF SUMMARY OF THE INVENTION

One aspect of the invention provides a system for collecting information related to a video game, comprising: a physical object including a memory for storing marketing information related to a video game; and a first video game system in communication with the toy for executing instructions to a conduct a video game play using the physical object, the first video game system being configured to monitor marketing information and write the information to the memory of the physical object.

Another aspect of the invention provides a system for collecting information related to a video game, comprising: a physical object including a memory for storing marketing information related to a video game; a first video game system in communication with the toy for executing instructions to a conduct a video game play using the physical object, the first video game system being configured to monitor marketing information and write the information to the memory of the physical object; and a server in communication with the physical object to receive the information and store the information in a storage unit.

These and other aspects of the invention are more fully comprehended upon review of this disclosure.

DETAILED DESCRIPTION

Figure 1:
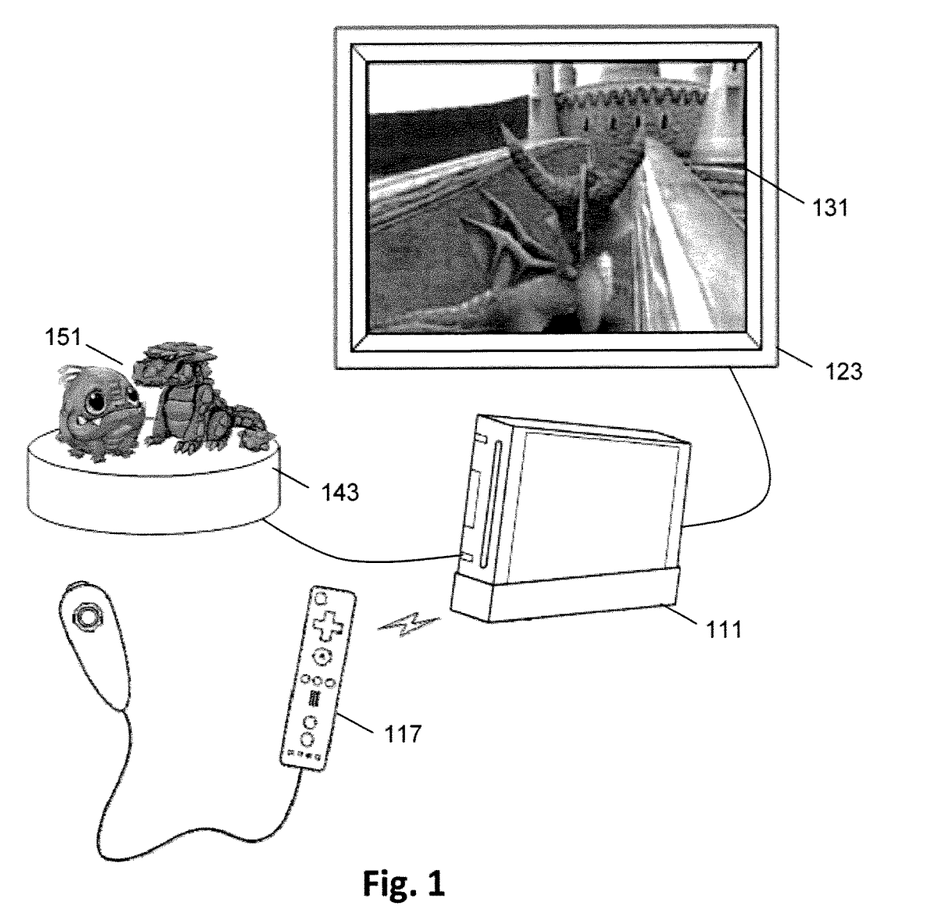
FIG. 1 illustrates an example of a video game system in accordance with aspects of the invention.

FIG. 1 illustrates an example of a video game system in accordance with aspects of the invention. The video game system includes a game console 111 with a processor for executing program instructions providing for game play and associated circuitry, user input devices such as a game controller 117, a display device 123, and a toy reader 143, which in various embodiments includes the capability to provide write information to a toy but for convenience will generally be termed a reader. The game console may be any video gaming platform including but not limited to Playstation®, Xbox®, Wii®, Nintendo DS®, a personal computer or a mobile gaming device. The processor, responsive to inputs from the user input devices and the toy reader, generally commands display on the display device of game characters in and interacting with a virtual world of game play and possibly each other. In addition, the processor, responsive to inputs from the reader, may also add characters and objects to the virtual world, with the characters able to manipulate the added objects and move about the virtual world. For example, the processor may include characters in game play based on inputs from the reader, and the processor may control actions and activities of game characters based on inputs from the user input devices.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad.

The display device is generally coupled to the game console by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the game console. In the embodiment of FIG. 1, the display screen shows a screen shot of video game play. As illustrated, the screen shot shows a display of a character, generally controlled by and animated in accordance with user inputs, approaching an inanimate item in the form of what may be considered a castle.

The toy reader, in some embodiments and as shown in FIG. 1, has a substantially flat upper surface for placement of toys thereon. The game player generally places game toys, for example objects 151 in the form and representative of a dragon and another fantasy figure as shown in FIG. 1, on the flat surface of the reader during game play. The toys are generally in the form of and representative of game items such as game characters or other game items. In most embodiments, the toys are associated with game characters during game play.

Each toy includes machine-readable information, for example, memory, a radio frequency identification (RFID) tag or a barcode. The machine-readable information may be sensed, read, and/or in some embodiments written, by the reader, in some embodiments indirectly by way of sending data and commands to the toy to write the data to memory of the toy. The machine-readable information may include a numeric identifier. The machine-readable information allows the reader, or the processor of the game console, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game.

When a toy is read by the reader, the reader provides the game console an indication of the identifier and status information of the toy, and generally the processor of the game console commands display of a corresponding game character or otherwise makes the corresponding game character available in game play. Likewise, when a toy in the form of an article such as a hat is placed on the reader, the processor may make a corresponding article appear in the game and the article may affect changes or the ability to make changes in the game. For example, when a hat toy and a character toy are concurrently on the reader, the corresponding character in the game may possess the corresponding hat. Thus, video game play may be affected by use of real world objects, objects which may also be utilized for play and/or observation separate from video game play.

Figure 2:
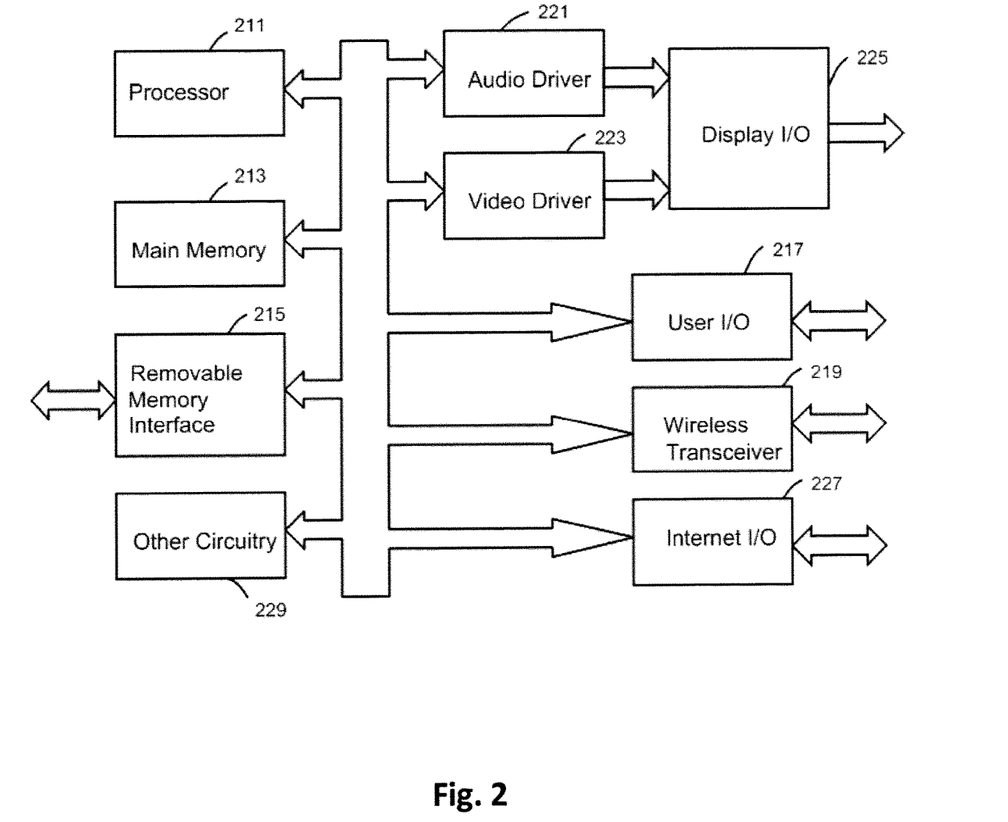
FIG. 2 is a block diagram of a video game console in accordance with aspects of the invention.

FIG. 2 is an example of a block diagram of a processor and associated circuitry, for example, for a game console, useful in accordance with aspects of the invention. As shown in FIG. 2 a processor 211 is connected to other components via a bus. The other components include a main memory 213 and a removable memory interface 215 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console. Sound signals may also be supplied to a peripheral device such as a toy reader.

The processor may also be coupled to a user I/O device 217, a wireless transceiver 219, an Internet I/O device 227, and other circuitry 229. The user I/O device may receive signals from a toy reader and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 3:
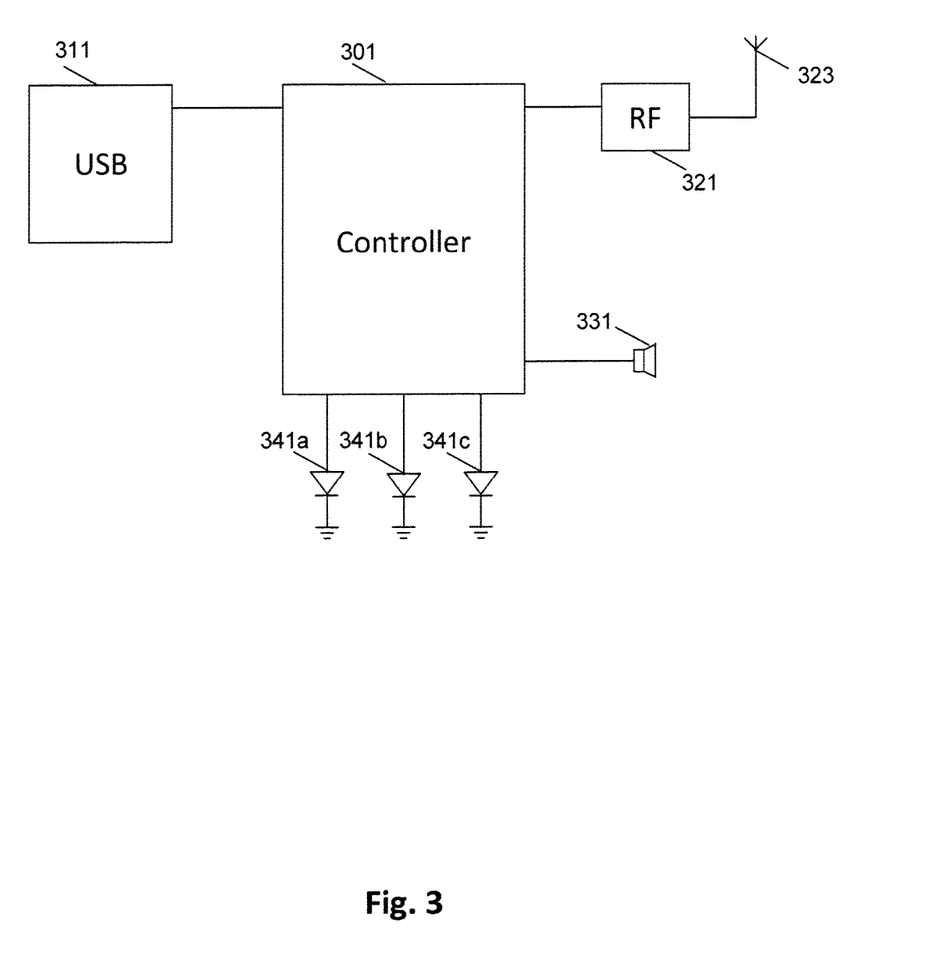
FIG. 3 is a block diagram of a video game peripheral in accordance with aspects of the invention.

FIG. 3 is a block diagram of a video game peripheral in accordance with aspects of the invention. The peripheral may be used in some embodiments as the toy reader of FIG. 1. The peripheral may be used to provide information from the toy to a game console and, in some embodiments, from the game console to the toy. Accordingly, the peripheral includes a universal serial bus (USB) interface 311 to communicate with the game console. In some embodiments, the peripheral may use a different interface, for example, a wireless interface for communication with the game console. The peripheral also includes a radio-frequency (RF) interface 321 to communicate with toys. In many embodiments, the radio-frequency interface is a radio frequency identification (RFID) interface. In other embodiments, the peripheral may include a different interface for communicating with toys, such as an optical interface or a wired interface.

In one embodiment of an optical interface the toy includes a light source, for example an LED, to provide information of the machine readable information and a photodiode to receive information of commands, with circuitry operable within the toy to provide for associated operation of the LED and photodiode in performing communication functions. Power may be provided to the toy by way of a battery, by way of RFID operations, or by other sources. In such an embodiment the toy reader similarly includes a photodiode and LED for communication with the toy.

In another embodiment the toy reader includes an imaging device, for example a CCD and associated circuitry. In such embodiments the imaging device may generate an image, for analysis by the reader or in most embodiments by the game console, with the image providing information related to the toy. In some embodiments identity of the toy may be determined by shape or other features, such as color or reflectivity, of the toy or portions of the toy. Similarly, identity and other information of the toy may be provided by image information placed on the toy, including, for example, information of stickers placed on the bottom of the toy, placed either prior to receipt of the toy by a user or by the user, in which case the information may be changed by the user in accordance with game play results. The toy may instead or in addition may include bar code or bar code like information, with the reader including bar code scanning components.

Further in some embodiments the toy may include a wired connection to the reader, or in some embodiments, a wired connection to the game console, possibly dispensing with the reader. Similarly, in some embodiments the toy may include wireless communication capabilities of the type commonly used with computers, for example Bluetooth or Wi-Fi capabilities.

The information communicated between the toy and the peripheral and between the peripheral and the game console may be encrypted, and the information read from or written to the toy by the peripheral may also be encrypted.

The peripheral includes a controller 301 that is coupled to the USB interface and the radio-frequency interface. The controller adapts the signals between protocols used by the two interfaces. The controller generally includes a programmable device such as a microprocessor performing program instructions and a memory. The program instructions may be stored in the peripheral as firmware or downloaded from the game console.

The peripheral also includes, in some embodiments, a loudspeaker 331. The loudspeaker provides audio signaling to game players and the signaling may relate to a particular toy present on the peripheral. In some embodiments, the peripheral includes visual indicators such as light-emitting diodes 341a-c. The diodes may, for example, be illuminated with intensities or colors according to characteristics of the toy or to signal performance in the video game of characters associated with toys on the peripheral. Both the loudspeaker and visual indicators are coupled to the controller. The controller signals the loudspeaker and visual indicators to operate according to commands received via the USB interface.

Figure 4:
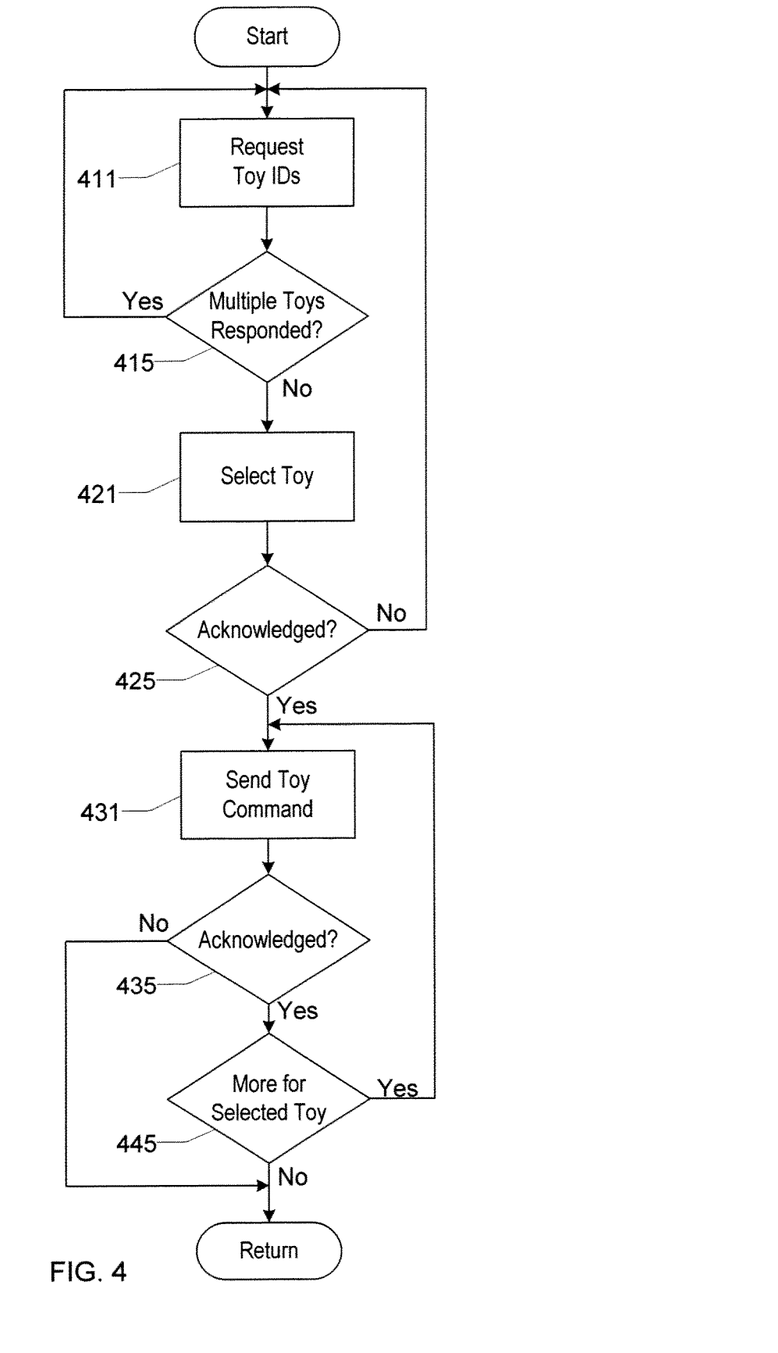
FIG. 4 is a flowchart of a process for communication with a toy in accordance with aspects of the invention.

FIG. 4 is a flowchart of a process for communication with a toy in accordance with aspects of the invention. The process may be implemented by a video game peripheral, for example, the video game peripheral of FIG. 3. The process may be performed utilizing a standardized protocol, for example, the ISO/IEC 14443 standard for Identification Cards. Accordingly, the process may communicate with toys via radio-frequency communication.

In block 411, the process requests toys send their identifiers. For example, in an embodiment of the process that uses the ISO/IEC 14443 protocol, the process may transmit a request command (REQA) or a wake-up command (WUP). The process listens for and receives any responses to the request that toys send their identifiers. Each identifier is generally unique to a particular toy.

In block 415, the process determines whether multiple toys responded to the request sent in block 411. For example, multiple toys may respond when there are multiple toys on the peripheral device of FIG. 3. The process may determine that multiple toys responded by detecting a collision between identifiers in the responses received in block 411. When the process determines that multiple toys responded, the process returns to block 411; otherwise, the process continues to block 421. The process may also determine that no toys responded. In various embodiments, the process may return when no toys responded or may return to block 411.

The process may, in block 411, include a range of identifiers in the request that toys send their identifiers. For example, the process may include a string of bits (for example, least-significant bits) in the request with only toys having identifiers with starting bits having values that match the string being requested to send their identifiers. The process may iterate through block 411 and block 415 with an increasingly narrow range of identifiers in the request until an identifier is individually received from each toy.

In block 421, the process selects a toy for further communication. The process may, for example, select the toy by sending a select command (SEL) that includes the identifier of the selected toy.

In block 425, the process determines whether it received an acknowledgment from the toy in response to the selection. The process may, for example, determine that it received an acknowledgment when it receives a selection acknowledge (SAK) message from the selected toy. When the process determines that it has received an acknowledgment, the process continues to block 431; otherwise, the process returns to block 411. In other embodiments, the process may return when an acknowledgment has not been received or may return to block 421. When the process does not receive an acknowledgment, the process may additionally inform a game with which the process is associated that the selected toy is not present.

In block 431, the process sends a command to the selected toy. For example, the process may send a read command to acquire data from the toy or a write command to supply data to the toy.

In block 435, the process determines whether it received an acknowledgment from the toy in response to the command sent in block 431. The process may, for example, determine that it received an acknowledgment when it receives a message containing a positive acknowledgment (ACK) from the selected toy. When the process determines that it has received an acknowledgment, the process continues to block 445; otherwise, the process returns. In other embodiments, the process may return to block 531 when an acknowledgment has not been received. When the process does not receive an acknowledgment, the process may additionally inform the game associated with the process that the selected toy is not present.

In block 445, the process determines whether it has any more commands to send to the selected toy. The process may determine that it has more commands for the toy, for example, by checking a list of actions in the game associated with the process. When the process determines that there are more commands for the selected toy, the process returns to block 431; otherwise, the process returns.

Figure 5:
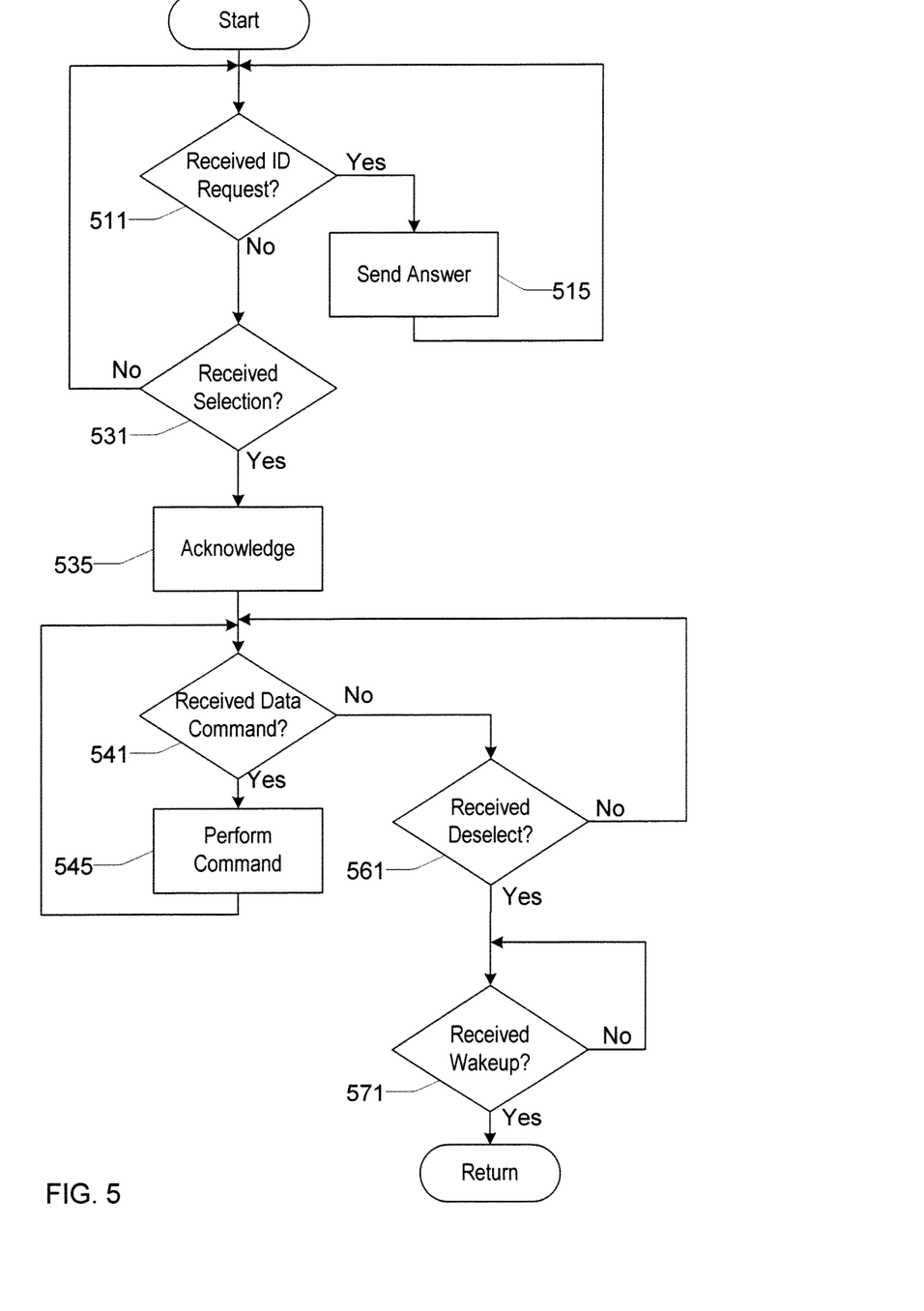
FIG. 5 is a flowchart of a process for communication with a video game peripheral in accordance with aspects of the invention.

FIG. 5 is a flowchart of a process for communication with a video game peripheral in accordance with aspects of the invention. The process may be implemented by a toy used in a video game, for example, the toy of FIG. 1. The process may be performed utilizing a standardized protocol, for example, the ISO/IEC 14443 standard for Identification Cards. Accordingly, the process may communicate with a video game peripheral via radio-frequency communication. Furthermore, the process may communicate with a video game peripheral that performs the process of FIG. 4.

In block 511, the process determines whether it has received a request for an identifier associated with the toy. For example, in an embodiment of the process that uses the ISO/IEC 14443 protocol, the process may determine whether it has received a request command (REQA) or a wake-up command (WUP). When the process determines that it has received a request for its identifier, the process continues to block 515; otherwise, the process continues to block 531.

In block 515, the process sends an answer to the request for its identifier. The answer generally includes the identifier or a portion of the identifier. For example, the request for the identifier may have included a portion of the identifier with the process including the remaining portion of the identifier in the answer. Thereafter, the process returns to block 511.

In block 531, the process determines whether it has been selected for further data communication. The process may, for example, determine that it has been selected when a select command (SEL) is received that includes the identifier of the toy. When the process determines that it has been selected, the process continues to block 535; otherwise, the process returns to block 511.

In block 535, the process acknowledges the selection determined in block 531. The process may, for example, transmit a selection acknowledge (SAK) message.

In block 541, the process determines whether it has received a data command. The process may, for example, determine that it has received a command instructing it to read data from or write data to a memory. When the process determines that it has received a data command, the process continues to block 545; otherwise, the process continues to block 561.

In block 545, the process performs the command of block 541. For example, the process may perform a read command by reading values from the memory and transmitting the values. In another example, the process may perform a write command by writing values supplied with command to the memory and transmitting an acknowledgment of the command. Thereafter, the process returns to block 541.

In block 561, the process determines whether it has been deselected from further data communication. The process may, for example, determine that it has been deselected when it receives a deselect command (DESEL) or a halt command (HLTA). When the process determines that it has been deselected, the process continues to block 571; otherwise, the process returns to block 541. In some embodiments, the process may return when it determines that it has been deselected.

In block 571, the process determines whether it should wake-up. The process may, for example, determine that it should wake-up when it receives a wake-up command (WUP). When the process determines that it should wake-up, the process returns: otherwise, the process remains in block 571. When the process is in block 571, it may be considered to be in a halted state in that it does not respond to identification requests, selection commands, or data commands.

Figure 6:
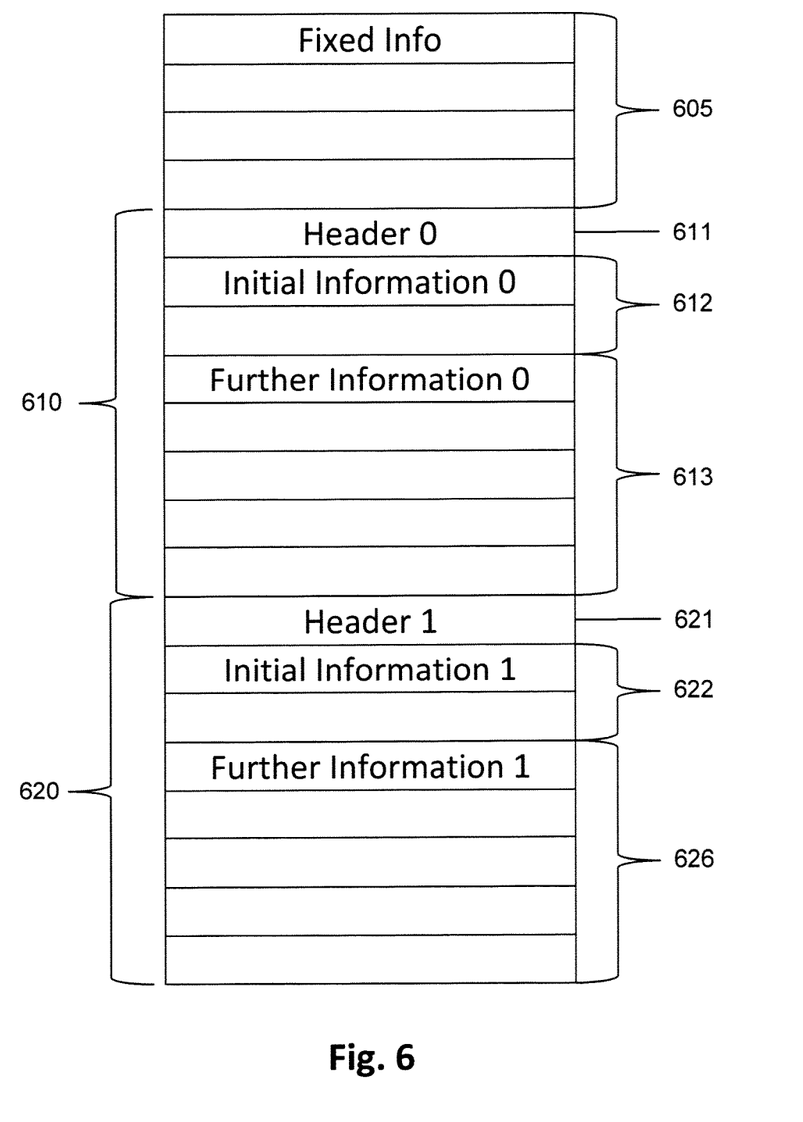
FIG. 6 is a diagram of data structure in accordance with aspects of the invention.

FIG. 6 is a diagram of data structure in accordance with aspects of the invention. The structure may be used to store data in a memory of a toy. Information about the toy, such as its characteristics and its status, are stored at various locations in the data structure. Although various fields of the data structure are shown in particular locations in FIG. 6, the data structure may use a different arrangement of the fields.

The data structure includes an area of fixed information 605. The fixed information includes information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or checksum. The fixed information is generally written when the toy is created and not thereafter changed.

The data structure also includes a first data area 610 and a second data area 620. Each of the data areas contains corresponding fields for certain values representing status information about the toy. However, the first data area and the second data area contain values that reflect the toy's status at different times. For example, the first data area may contain current values and second data area may contain previous values. How which of the data areas is current may be determined and controlled is described further with reference to FIGS. 7 and 8.

The first data area 610 includes a first header 611. The first header includes information about the toy that may change frequently during game play, such as fields that store score values, experience levels, or money values. The first header may also include a field indicating how much cumulative time the toy has been used. The first header also contains a sequence field that may be used to determine whether the first data area contains current data.

The first data area 610 includes a first initial information area 612. The first initial information area includes information about the toy that facilitates adding the toy to game play. For example, the first initial information area may include a field that stores a name for the toy. The first initial information area may include additional fields that store information useful for displaying a representation of the toy in the game. For example, there may be information indicating upgrades that have been acquired for the toy or objects the toy may be wearing, such as hats.

The first data area 610 includes a first further information area 613. The first further information area includes fields that indicate additional information about the toy's status beyond the information contained in the first header and the first initial information area. The fields in the first further information area may include, for example, an indication of what challenges or skill tests the toy has completed in the game. The fields in the first further information area may also include information related to gameplay, for example, a value indicating when the toy most recently joined the game, a value indicating when the toy was first used in the game, a value indicating the total time that the toy has been used in the game, an identification of the different types of video game system that the toy have been used in connection with to play the game and the frequency of such use on each of a different types of video game systems. The information may also include game-related statistics such as hit points, score, a number of a collectible item collected. Further, the information may also include game state information. The game state information includes, but is not limited to, the level of the game being played, the mode of play, length of time played during a game play session.

The first data area generally includes one or more fields for data verification, for example, checksums. In one embodiment, the first header includes three checksums: a checksum for the entire first data area, a checksum for the initial information area, and a checksum for the header itself. The inclusion of three checksums may allow the corresponding areas to be verified or updated without reading or writing other areas.

The second data area 620 includes a second header 621, a second initial information area 622, and a second further information area 623. Each of the areas in the second data area corresponds to a like named area in the first data area.

Figure 7:
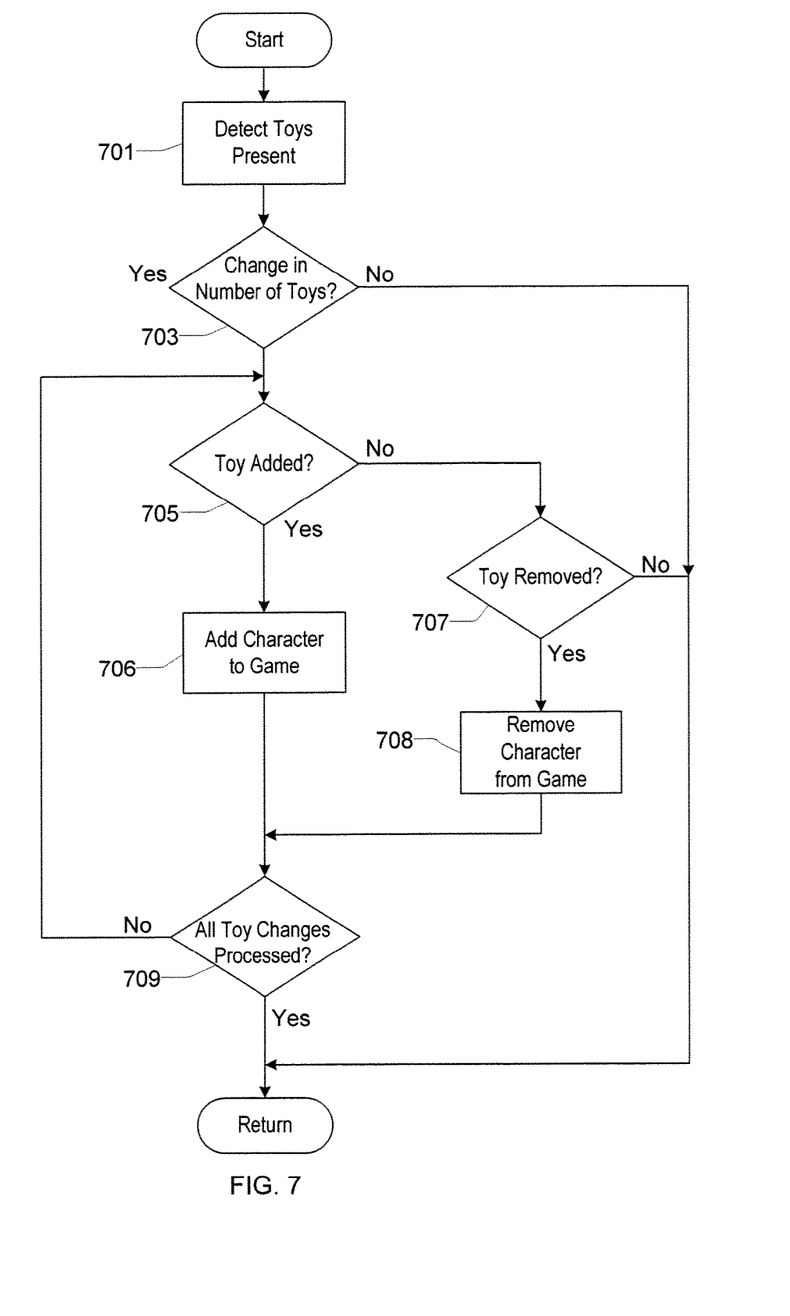
FIG. 7 is a flowchart of a process for reading toy information in accordance with aspects of the invention.

FIG. 7 is a flowchart of a process for reading information from a toy in accordance with aspects of the invention. The process may be performed in association with a video game and may be performed by a video game console, for example, the video game console of FIG. 1. The process may also be used with a toy that stores information in a data structure as illustrated by FIG. 6. Additionally, a video game console may perform multiple instances of the process concurrently, for example, performing an instance of the process for each of multiple toys.

In block 711, the process reads fixed information from the toy. The information may be read using a process as shown in FIG. 4. The fixed information includes values that uniquely identify the toy and type of toy.

In block 721, the process reads header information for each of multiple data areas of the toy information. Each header is associated with a data area. The header information includes a sequence value indicating when, in comparison to other headers, the header was written. For example, the sequence value may be incremented modulo a maximum value each time a header is written.

In block 731, the process determines which of the headers is the current, or newest, header. The process may compare the sequence values of the headers to determine the latest sequence value, which indicates the current header. The process selects the data area associated with the current header for further use in the process.

In block 741, the process reads initial information from the toy. The initial information is read from the data area associated with the current header. In block 751, the process adds a representation of the toy in the video game. For example, the process may display a representation of the toy, including information about the toy included in the initial information, on the display screen of the video game system illustrated by FIG. 1.

In block 761, the process reads further information from the toy. The further information is also read from the data area associated with the current header. In block 771, the process enhances the representation of the toy in the video game. For example, the process may add details read in block 761 to the representation of the toy.

The process of FIG. 7 may include error checking of information read from the toy. When the process determines that data read from the toy contains an error, it may alter the processing. For example, if one of the headers read in block 721 contains an error, the header and its associated data area may be excluded from further processing by selecting a different header as the current header in block 731.

Figure 8:
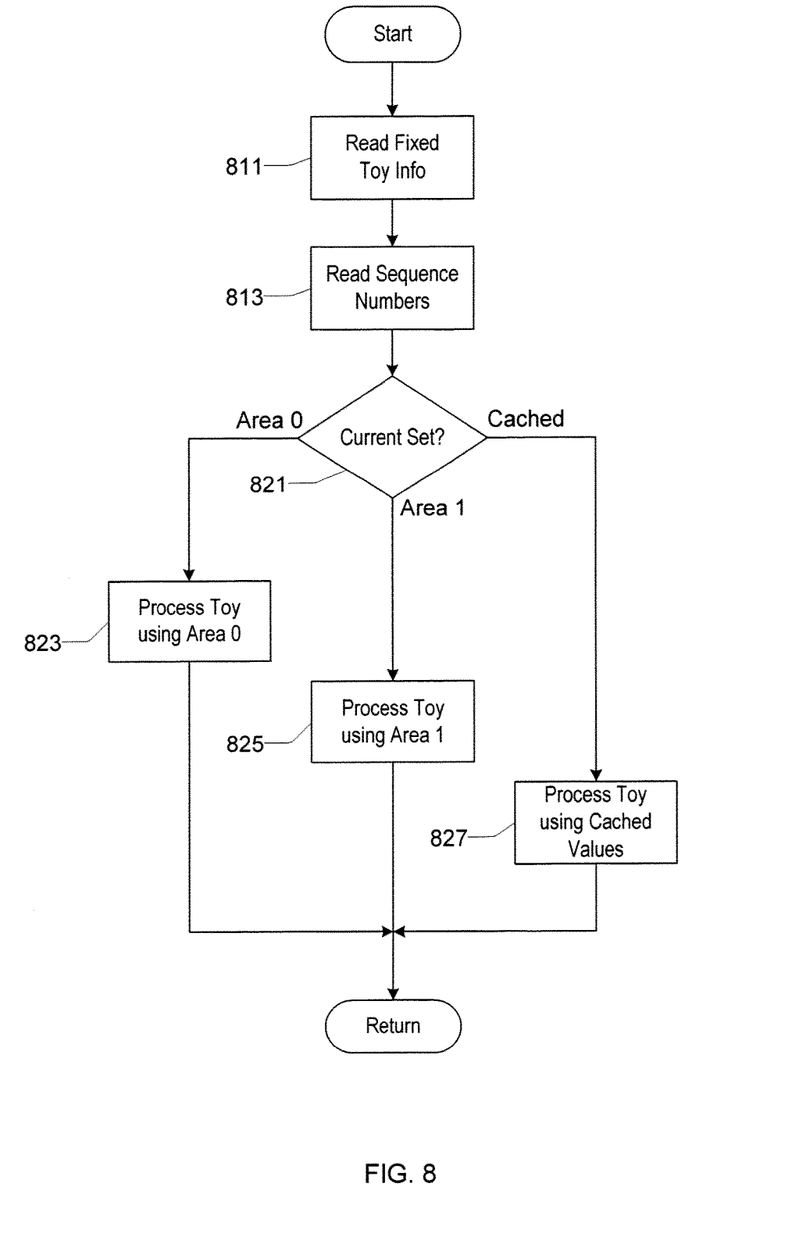
FIG. 8 is a flowchart of a process for writing toy information in accordance with aspects of the invention.

FIG. 8 is a flowchart of a process for writing information to a toy in accordance with aspects of the invention. The process may be performed in association with a video game and may be used to modify data that was read by the process of FIG. 7.

In block 811, the process determines an event type that may result in updating information in the toy. The process may determine the event type based on game play events. If the process determines that the event type is a time change, the process returns. That is, a time-change event does not result in the process writing information to the toy.

If the process determines that the event type is a critical event, the process continues to block 831. A critical event is an event for which it is desirable to quickly update information in the toy. Critical-type events may include, for example, changes to the toy's name, changes to performance levels of the toy, or acquisition of upgrades for the toy.

If the process determines that the event type is a routine event, the process continues to block 821. A routine event is an event for which it is acceptable to delay writing information in the toy. Routine-type events may include, for example, changes to the toy's score or changes to the experience level of the toy. Routine-type events may occur frequently during game play and thus it may be desirable to otherwise use the time that would be used to write to the toy, for example, to read information from another toy.

In block 821, the process waits for a time delay. For example, the process may wait three seconds. The process thereafter continues to block 831. In some embodiments, further events may be evaluated in block 811 while the process is waiting in block 821. When a further event occurs, the process may continue waiting for the current time delay, restart the time delay, or end the time delay. For example, when the event is a time change, the process may continue waiting; when the event is a routine event, the process may restart the delay; and when the event is a critical event, the process may terminate the delay and continue to block 831.

In block 831, the process writes information to the toy. The written information generally corresponds to the event as analyzed in block 811. For example, when the event is an event to change the toy's name, a new name is written to the toy. The data is written to a data area that is the oldest of multiple data areas in the toy. The process may determine which data area to write to in a manner analogous to that used to determine the current data area in the process of FIG. 7. In particular, when there are two data areas in the toy, the oldest data area is the one that is not the current data area.

In block 841, the process writes the header of the data area in block 831. Writing the header includes writing a sequence number in the header to indicate that the associated data area is now the current data area. For example, a sequence number value from the current data area may be incremented, modulo a maximum value, and written to the header.

The process, in many embodiments, verifies that the information writes in blocks 831 and 841 were successful. For example, the process may read the values back from the toy and compare the results to the expected values. In the event of an error, the process may retry writing the information to the toy.

Figure 9:
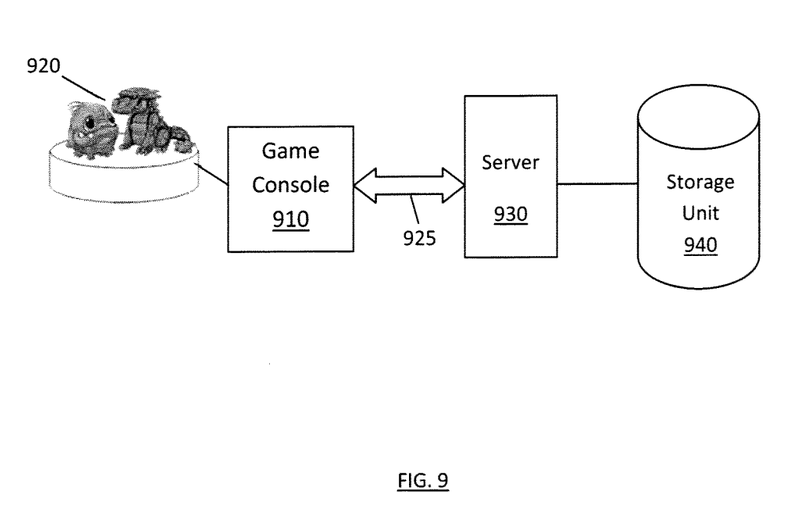
FIG. 9 is a flowchart of a process for developing game player skills in accordance with aspects of the invention.

FIG. 9 is a block diagram illustrating a system for providing to a server information developed during video game play according to aspects of the present invention. Referring to FIG. 9, the system may include a game console 910 having a processor for executing instructions to provide game play using physical object 920. The game console may be one of a plurality of different gaming platforms as described above. Further, the physical object which may be a toy, for example, may be used in connection with any of the plurality of different gaming platforms without alteration. For example, the physical object can be used in connection with a first game console operating a video game and may thereafter be used in connection with a second game console, which may be of a different type operating a video game, in accordance with aspects of the present invention.

The system further includes a server 930 to receive information collected during video game play on the game console using the physical object. The server may be coupled to the game console via a communications network 925 such as the Internet such that the marketing information may be provided to the server for storage in a storage unit 940 such as a database or other data repository. The information may be provided to the server on a periodic basis or as the information is developed.

In an embodiment, the data may be read directly from the physical object via a personal computer and provided to the server without the use of a game console.

The information may be collected from a plurality of physical objects. In one example, the physical objects comprise a variety of fantastical creatures, each of which include a memory and may be used in connection with a video game console to conduct video game play. The collection of information may be analyzed to determine which creatures are most popular, which are used more frequently, and to identify which creatures are used most frequently on a particular type of gaming console. The information may also be analyzed to determine trends in use of each creature.

In one embodiment, the information may in a memory of the peripheral. In this case, the peripheral may store information related to each toy or object encountered in the detection area of the peripheral.

Figure 10:
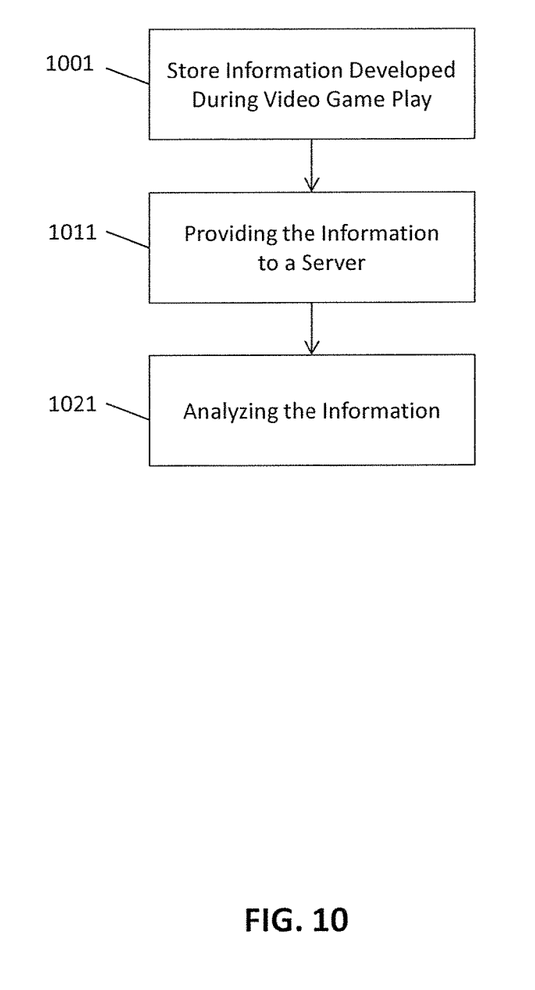
FIG. 10 is a flowchart of a process for collecting information related to a video game including a physical object.

FIG. 10 is a flowchart of a process for collecting information related to a video game including a physical object. Referring to FIG. 10, in block 1001, the process stores information developed during video game play using the physical object. The information may be stored on the gaming console and/or in the memory of the physical object. In block 1011, the process provides the information to a server for storage in a storage device. The information may be transmitted to the server from the gaming console via a network connection, such as during an online gaming session. Alternatively, the information may be provided from the memory of the physical object. In this case, the physical object may be communicatively coupled to computing device which may be used to transmit the information to the server.

In block 1021, the process analyzes the information stored in the storage device .

Although the invention has been discussed with respect to various embodiments, it should be recognized that the invention comprises the novel and non-obvious claims supported by this disclosure.

What is claimed is:

1. A system for collecting cumulative time and frequency related information related to a video game, comprising:
   a toy configured to communicate with each of a plurality of different types of video game platforms without alteration, the toy including a memory for storing information related to a video game, the information including cumulative time information, frequency information, and an identification of a type of video game platform connected to the toy, the type of video game platform being one of the plurality of different types of video game platforms, that is in communication with the toy, the toy representative of a virtual video game character or object usable within a video game;
   a toy reader configured to connect to a first video game system of a first video game platform type; and
   the first video game system configured for communication with the toy through the toy reader and for executing instructions to conduct video game play using information related to the toy, the first video game system being further configured to monitor cumulative time information and frequency information and to write the cumulative time information and the frequency information to the memory of the toy;
   wherein the cumulative time information comprises a cumulative time with which the toy has been used in connection with the type of
   video game platform that is in communication with the toy, and the frequency information comprises information related to a frequency with which the toy is used to conduct video game play with each of a different type of video game platform of the plurality of different types of video game platforms.

2. The system of claim 1, wherein the toy is a race car.

3. The system of claim 1, wherein the toy is an action figure.

4. The system of claim 1, wherein the toy is a robot.

5. The system of claim 1, wherein the toy is a mythical figure.

6. A system for collecting type of video game platform information and frequency information related to a video game, comprising:
   a server configured to receive, from a video game system communicatively coupled with a toy, particular information stored in a memory of the toy, and to store the particular information in a storage unit, wherein the particular information is developed during video game play using the toy, and wherein the particular information includes an identification of a type of video game platform that has been in communication with the toy and information related to a frequency with which the toy is used in connection with each different type of a plurality of types of video game platforms; wherein the memory of the toy further includes information to identify a virtual video game object to be used during video game play and wherein the toy is usable with the plurality of types of video game platforms without alteration.

7. The system of claim 6, wherein the particular information further includes a cumulative time with which the toy has been used in connection with the video game system to conduct video game play.

8. The system of claim 6, wherein the particular information further includes information related to a frequency with which the toy is used in connection with the video game system to conduct video game play.

9. The system of claim 6, wherein the toy is a race car.

10. The system of claim 6, wherein the toy is an action figure.

11. The system of claim 6, wherein the toy is a robot.

12. The system of claim 6, wherein the toy is a mythical figure.

13. The system of claim 6, wherein the server is configured to communicates with the video game system via a computer network.

14. A computer implemented method for providing video game related information to a server, comprising:
   for each of a plurality of toys that are configured to communicatively couple with each of a plurality of different types of video game platforms without alteration, representative of fantastical creatures and having computer readable information, the computer readable information including an identity of a virtual representation of the toy within a video game, storing an indication of a time of first use in the video game and an indication of frequency of use at each of a different type of video game platform of a plurality of different types of video game platforms; and
   providing the indication of the time of first use in the video game of a particular video game platform type and the indication of frequency of use on each of the different type of video game platform to a server through the video game system over a network.

15. The method of claim 14, further comprising storing a cumulative time of use at each of the different type of video game platform, and providing the cumulative time of use on each of the different type of video game platform to the server through the video game system over the network.

16. The method of claim 14, wherein each of the different type of video game platform includes a different type of game console.

17. The system of claim 1, wherein at least one of the plurality of different types of video game platforms comprise a game console.

18. The system of claim 17, wherein the plurality of different type of video game platforms includes a plurality of different types of game consoles.

* * * * *

UNITED STATES PATENT AND TRADEMARK OFFICE
CERTIFICATE OF CORRECTION

PATENT NO. : 10,238,977 B2
APPLICATION NO. : 13/109896
DATED : March 26, 2019
INVENTOR(S) : Paul Reiche, Joby-Rome Otero and Charles H. Batson It is certified that error appears in the above-identified patent and that said Letters Patent is hereby corrected as shown below:

On the Title Page

Change the title "COLLECTION OF MARKETING INFORMATION DEVELOPED DURING VIDEO GAME PLAY" to --PROVIDING INFORMATION DEVELOPED DURING VIDEO GAME PLAY TO A SERVER--, therefor.

Signed and Sealed this
Twenty-fifth Day of June, 2019

Andrei Iancu
*Director of the United States Patent and Trademark Office*